US008095457B2

(12) United States Patent
Polston et al.

(10) Patent No.: US 8,095,457 B2
(45) Date of Patent: Jan. 10, 2012

(54) COMMUNICATION SYSTEM AND METHOD BETWEEN A HOME BUYER, SELLER, STRATEGIC BUSINESS SOURCE, AND LENDER

(75) Inventors: Stephen M. Polston, Excelsior, MN (US); Aaron Matthew Vennie, Burnsville, MN (US); Jeffery Matthew Colville, Maple Grove, MN (US); Michelle Patrice Hiller, Elk River, MN (US); Ronald J. Steele, Clear Lake, WI (US); Joan Marie Skallman, Excelsior, MN (US)

(73) Assignee: Preferred Home Buyers Network, Inc., Excelsior, MN (US)

( * ) Notice: Subject to any disclaimer, the term of this patent is extended or adjusted under 35 U.S.C. 154(b) by 61 days.

(21) Appl. No.: 11/999,299

(22) Filed: Dec. 4, 2007

(65) Prior Publication Data

US 2009/0144128 A1    Jun. 4, 2009

(51) Int. Cl.
*G06Q 40/00* (2006.01)
(52) U.S. Cl. .......................................... 705/38; 705/313
(58) Field of Classification Search .................... 705/38, 705/313
See application file for complete search history.

(56) References Cited

U.S. PATENT DOCUMENTS

| | | | |
|---|---|---|---|
| 5,032,989 A | 7/1991 | Tornetta | |
| 5,584,025 A | 12/1996 | Keithley et al. | |
| 5,664,115 A | 9/1997 | Fraser | |
| 5,754,850 A | 5/1998 | Janssen | |
| 5,794,216 A | 8/1998 | Brown | |
| 5,995,947 A | 11/1999 | Fraser et al. | |
| 6,236,977 B1 | 5/2001 | Verba et al. | |
| 6,321,202 B1 | 11/2001 | Raveis, Jr. | |
| 6,484,176 B1 | 11/2002 | Sealand et al. | |
| 6,519,618 B1 | 2/2003 | Snyder | |
| 6,594,633 B1 | 7/2003 | Broerman | |
| 6,678,663 B1 | 1/2004 | Mayo | |
| 6,684,196 B1 | 1/2004 | Mini et al. | |
| 6,871,140 B1 | 3/2005 | Florance et al. | |
| 6,883,002 B2 | 4/2005 | Faudman | |
| 6,973,432 B1 | 12/2005 | Woodard et al. | |
| 6,985,886 B1 | 1/2006 | Broadbent et al. | |
| 7,016,866 B1 | 3/2006 | Chin et al. | |
| 2001/0032175 A1 | 10/2001 | Holden et al. | |
| 2002/0029194 A1* | 3/2002 | Lewis et al. | 705/39 |
| 2002/0035520 A1* | 3/2002 | Weiss | 705/27 |

(Continued)

OTHER PUBLICATIONS

Office Action dated Sep. 14, 2011, U.S. Appl. No. 11/403,385, Polston et al.

(Continued)

*Primary Examiner* — Lindsay M. Maguire
(74) *Attorney, Agent, or Firm* — Beck & Tysver PLLC

(57) ABSTRACT

A computerized system and method are presented for exchanging information between a buyer, a seller, a lender, and a strategic business source. The system permits sellers, lenders and strategic business sources to input buyers that are then submitted for activation. The buyers use the system to obtain information about items, while the sellers, lenders, and strategic business sources make consistent contact with the buyer in order to work with the buyer. Information about the buyers is shared with the sellers, lenders, and strategic business sources. A business plan is input into the system for the financial institution employing the lender while another business plan is input for the seller institution employing the seller. Activity on the computerized system is calculated for compliance with the business plan. Feedback is provided to management relating to whether the business plan is being met.

9 Claims, 10 Drawing Sheets

U.S. PATENT DOCUMENTS

| | | |
|---|---|---|
| 2002/0046077 A1* | 4/2002 | Mozayeny et al. ............... 705/8 |
| 2002/0049624 A1* | 4/2002 | Raveis, Jr. ......................... 705/8 |
| 2002/0052814 A1* | 5/2002 | Ketterer ........................... 705/35 |
| 2002/0059137 A1* | 5/2002 | Freeman et al. ................ 705/38 |
| 2002/0069151 A1 | 6/2002 | Casper |
| 2002/0077893 A1* | 6/2002 | Wolf et al. ...................... 705/14 |
| 2002/0095385 A1* | 7/2002 | McAvoy et al. ................ 705/51 |
| 2003/0101063 A1* | 5/2003 | Sexton et al. ..................... 705/1 |
| 2003/0163408 A1* | 8/2003 | Polston et al. .................. 705/37 |
| 2003/0187756 A1* | 10/2003 | Klivington et al. ............. 705/27 |
| 2004/0030631 A1* | 2/2004 | Brown et al. ................... 705/37 |
| 2004/0143450 A1* | 7/2004 | Vidali ................................. 705/1 |
| 2006/0184448 A1* | 8/2006 | Polston et al. .................. 705/37 |

OTHER PUBLICATIONS

Office Action dated Jan. 31, 2007, U.S. Appl. No. 10/187,207, Polston et al.

Office Action dated Nov. 13, 2007, U.S. Appl. No. 10/187,207, Polston et al.

Office Action dated May 27, 2009, U.S. Appl. No. 10/187,207, Polston et al.

Office Action dated Mar. 3, 2010, U.S. Appl. No. 10/187,207, Polston et al.

Office Action dated Feb. 2, 2011, U.S. Appl. No. 10/187,207, Polston et al.

* cited by examiner

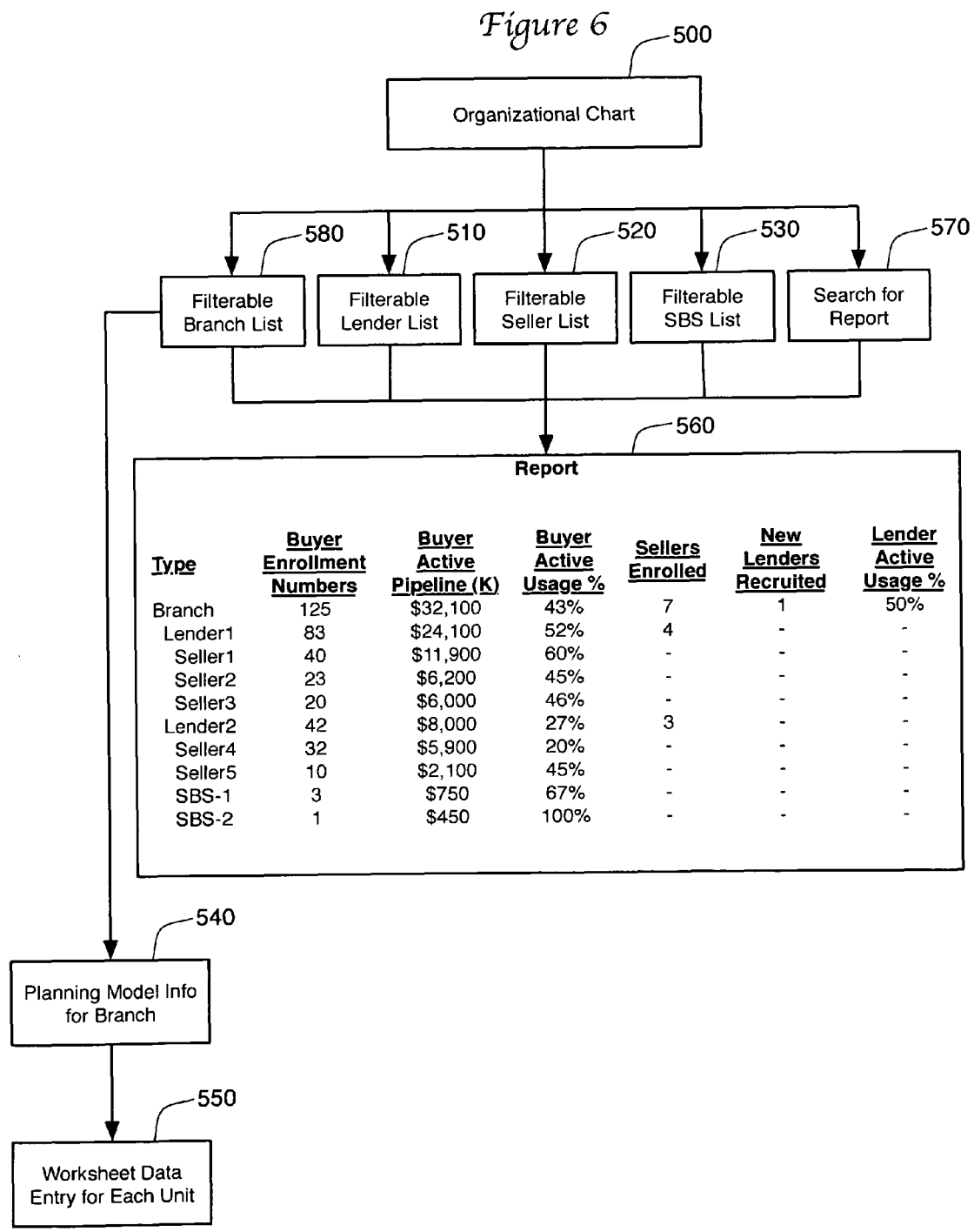

Figure 7

Lender/Loan Officer List — 510

Filter By: — 512

Select All — 524 | Broadcast E-mail — 516

| | Name | Branch | Contact Info | Enroll Date | Buyer Count | Buyer Pipeline ($K) | Seller Count | Links |
|---|---|---|---|---|---|---|---|---|
| ☐ | John Ho | First | john@lo.com | 11/04 | 23 | 32342 | 8 (6l2) | X √ Δ ◊ |
| ☐ | Lisa Smith | First | lisa@lo.com | 2/05 | 0 | 0 | 1 (1l0) | X √ Δ ◊ |
| ☐ | Juan Diaz | Second | juan@lo.com | 6/05 | 15 | 21050 | 4 (2l2) | X √ Δ ◊ |
| ☐ | Abdul Rahim | Second | abdul@lo.com | 11/05 | 11 | 16050 | 2 (2l0) | X √ Δ ◊ |

Figure 8

Seller List — 520

Filter By: — 522

Select All — 524 | Broadcast E-mail — 526

| | Name | Employer | Contact Info | Enroll Date | Buyer Count | Buyer Pipeline ($K) | Loan Officer | Links |
|---|---|---|---|---|---|---|---|---|
| ☐ | Liz Cook | Main St. RE | liz@msre.com | 7/05 | 8/4/8 | 3540 | Juan Diaz | X √ Δ ◊ |
| ☐ | Frank Wang | Main St. RE | frank@msre.com | 8/05 | 3/1/1 | 565 | Juan Diaz | X √ Δ ◊ |
| ☐ | Sue Vega | Uptown RE | sue@uptownre.com | 7/05 | 1/0/1 | 225 | Juan Diaz | X √ Δ ◊ |
| ☐ | Amir Lee | River RE | amir@riverre.com | 11/05 | 22/0/0 | 5800 | Juan Diaz | X √ Δ ◊ |

*Figure 9*

Affiliate/Strategic Partner Source List — 530

532 — Filter By:

534 — Select All  536 — Broadcast E-mail

| Name | Role | Contact Info | Enroll Date | Buyer Count | Buyer Pipeline ($K) | Loan Officer | Links |
|---|---|---|---|---|---|---|---|
| ☐ Brian Wu | Builder | brian@bldr.com | 7/05 | 7/1/3 | 1820 | Juan Diaz | X √ Δ ◊ |
| ☐ Sam O'Brien | Builder | sam@contract.com | 8/05 | 3/3/3 | 625 | Juan Diaz | X √ Δ ◊ |
| ☐ Karen Pinto | Architect | sue@greatarch.com | 7/05 | 17/1/9 | 12100 | Juan Diaz | X √ Δ ◊ |
| ☐ Mary Lamb | Home Inspect | amir@wefind.com | 11/05 | 21/6/11 | 8500 | Juan Diaz | X √ Δ ◊ |

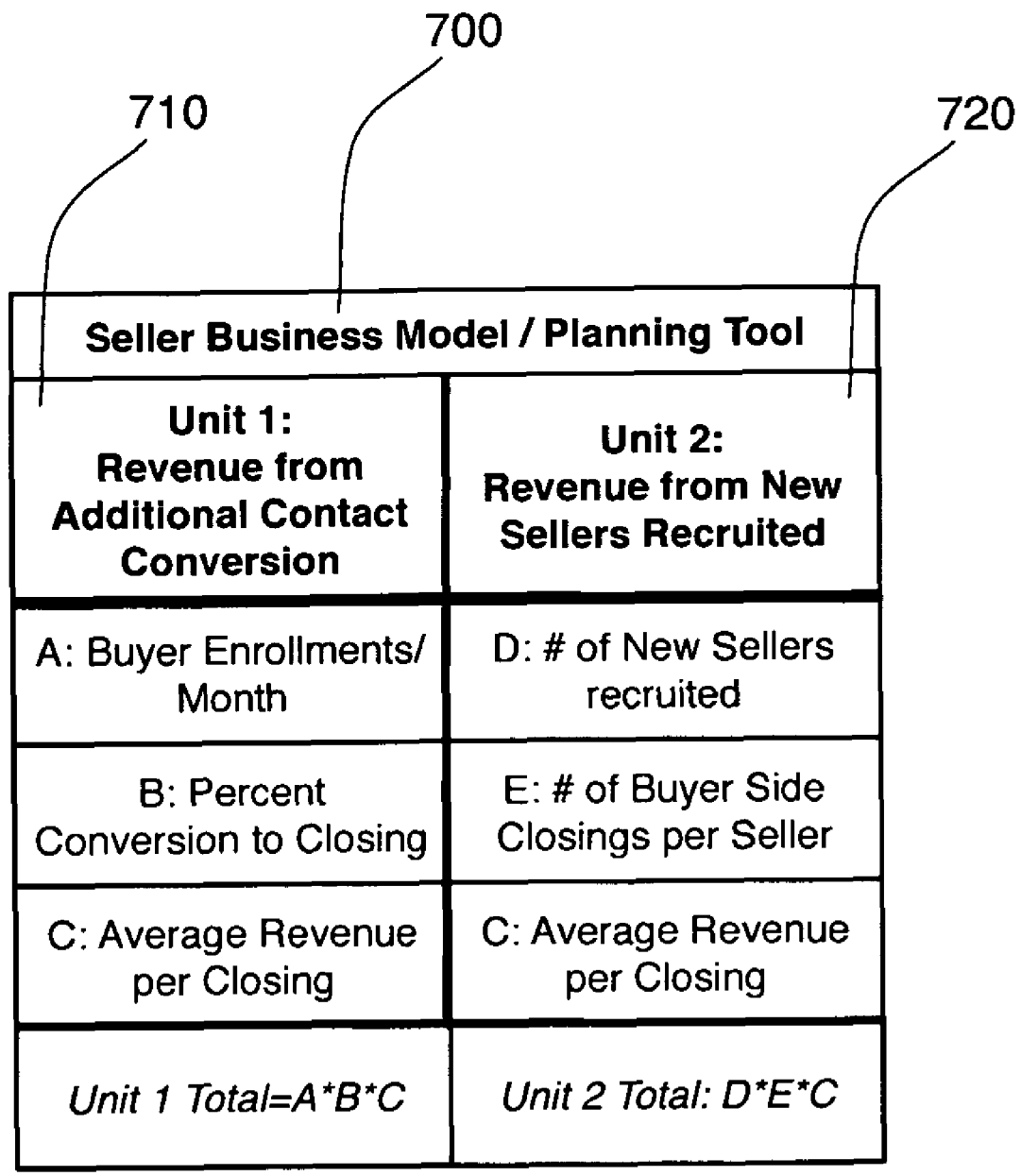

COMMUNICATION SYSTEM AND METHOD BETWEEN A HOME BUYER, SELLER, STRATEGIC BUSINESS SOURCE, AND LENDER

RELATED APPLICATIONS

This application is related to application Ser. No. 11/403,385, filed on Apr. 12, 2006, which is a continuation-in-part of U.S. patent application Ser. No. 10/187,207, filed on Jul. 1, 2002 and which itself claimed priority to U.S. Provisional Patent Application No. 60/359,804, filed Feb. 26, 2002. Each of these related applications is hereby incorporated by reference.

FIELD OF THE INVENTION

The present invention relates to the field of automating real estate sales contacts. More particularly, the present invention relates to a system for managing loan officers and lending institutions that participate in an automated system for communicating between a buyer, a seller, a lender, and a strategic business source.

BACKGROUND OF THE INVENTION

Typical real estate related web sites of the prior art provide for real time home searches based on a set of input search criteria. When such sites are used to manage contacts with a potential home buyer, the site is designed from the point of view of the agent. The agent is in charge of the relationship with the customer, and is responsible for recommending to the customer other professionals who may assist in the home purchase transaction. In other words, prior art web sites that allow customer development and communication focus on the agent. No effort is made to integrate the lender.

A method of providing information to a real estate buyer exists in the prior art that does allow some interaction between a buyer, a seller, and a lender. However, this prior art method is not computerized. In this method, the real estate agent takes information from a buyer regarding the buyer's preferences for purchasing a home and the buyer's contact information. The agent then provides this information to a lender. The lender will then certify the buyer based on the buyer's purchasing ability and forward the buyer's preferences and authorized price range to an administrator who manages a network of lenders. Based on this information, the administrator mails the buyer a listing of homes within the buyer's price range and matching the buyer's preferences. The administrator follows-up with the buyer, as does the agent and the lender. Contact is made typically in person, over the telephone, and through the mail. The administrator prompts the agent and lender to contact the buyer periodically by sending them a list of contact information that includes a suggestion as to which prospective buyer should be contacted by them at that time. No automated method exists that allows buyers to access real estate information while further providing an automated ability for a buyer, seller, and lender to communicate with each other.

SUMMARY OF THE INVENTION

The present disclosure is directed to a computerized system and method for exchanging information between a buyer, a seller, a lender, and a strategic business source. The present system and method permits a seller to enroll buyers and easily focus sales efforts at buyers who might not yet be ready to purchase. The system also provides opportunities for lenders and strategic business sources to enroll buyers. The system and method seamlessly integrate lenders, permitting lenders to participate earlier in the buying process. Also, the system and method helps educate and develop buyers, and provides for more personalized contacts with the lender, the seller, and any strategic business source during the earlier stages of the buying process. Finally, the system and method allows managers to track the performance of those entities and individuals that they manage against the business plan.

A computerized method for exchanging information between a buyer, seller, lender, and strategic business source is disclosed. The computerized method shares buyer-specific information between the seller, the lender, and the strategic business source. Such information can include buyer-specific preferences, and notes about and impressions of the buyer. The computerized system also generates item-information for the buyer based on the buyer-specific information. The item information can include a list of items meeting the buyer-specific preferences and a detailed description of each item on the list. The lender helps to develop a range of items the buyer can afford. The computerized system also monitors buyer activity related to the item information. For example, the seller and lender are able to view, based on the buyer's use of the computerized system, what items have caught the interest of the buyer. The seller and lender are able to focus their efforts based on this information. Also, the computerized system manages seller, lender, and strategic business source contacts with the buyer. For example, through a series of prompts, the seller, lender, and strategic business source can be alerted as to when to contact the buyer for follow-up based on information such as buyer's activity. In so doing, the system helps manage contacts with the buyer to help eliminate redundant communication and to move the buying process forward.

Financial institution managers are able to track whether individual lenders are fulfilling their obligations relating to client contacts. Furthermore, these managers are also to determine the performance of a branch or organization as it relates to certain goals that have been established as part of business model or planning tool. Finally, managers of real estate agents are able to compare the performance of those agents against goals established by the real estate agent organization.

BRIEF DESCRIPTION OF THE DRAWINGS

FIG. 6 is a block diagram of the organization tool interface found in the management interface of FIG. 5.

FIG. 7 is a block diagram of a lender list that is shown in FIG. 6.

FIG. 8 is a block diagram of a seller list that is shown in FIG. 6.

FIG. 9 is a block diagram of a strategic business source list that is shown in FIG. 6.

FIG. 11 is a table showing a business-model planning tool for seller institutions used by a first alternative embodiment of the present invention.

DETAILED DESCRIPTION OF THE INVENTION

Basic Configuration

Figure 1:
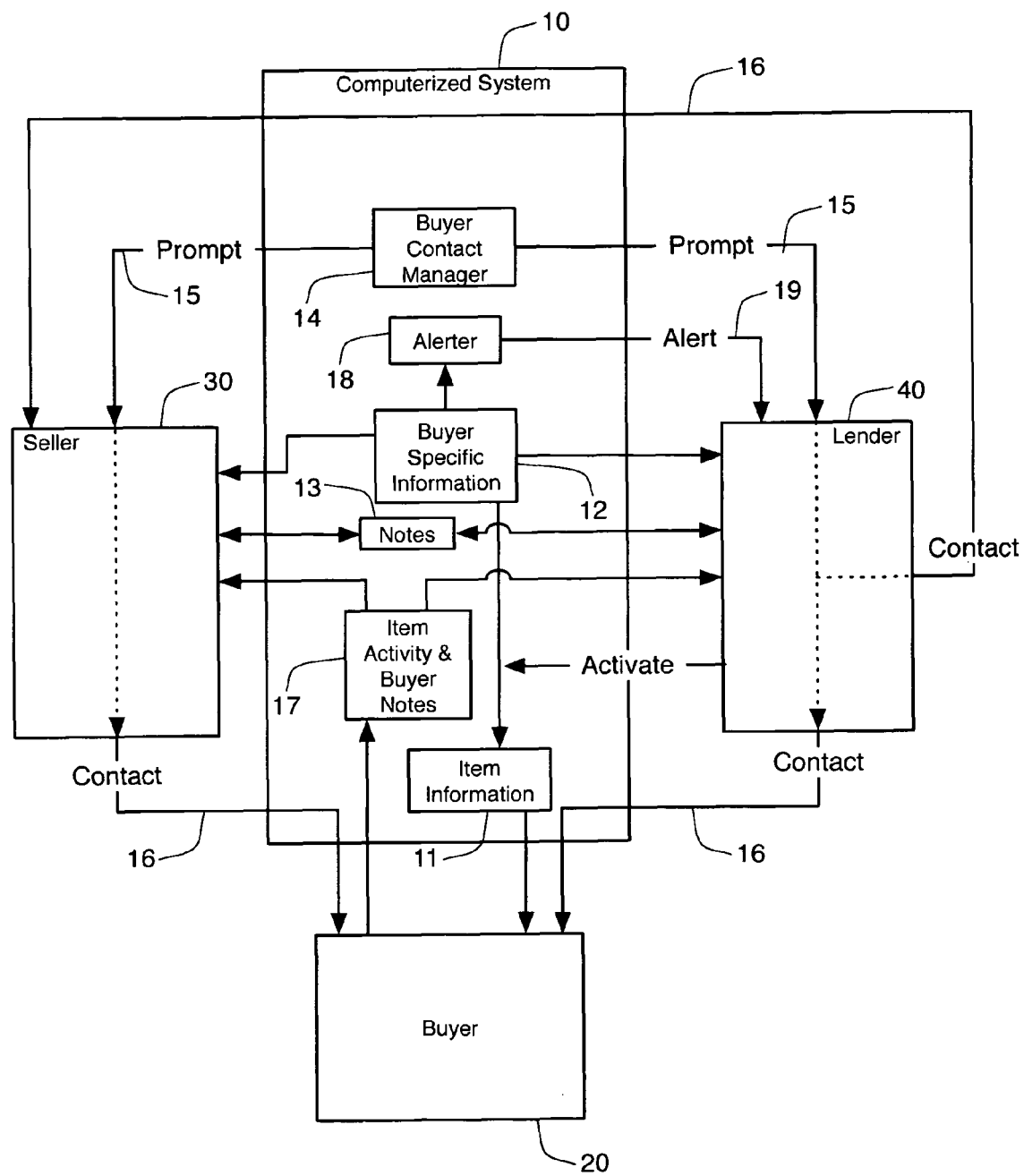
FIG. 1 is a block diagram of the computerized system of the present invention and its communications with a buyer, a seller, and a lender.

FIG. 1 shows a block diagram showing a buyer 20, seller 30, and lender 40 that are connected through a computerized system 10. The buyer 20 can include anyone generally interested in an item, regardless of whether that person or entity will actually acquire or own the item. Examples of a buyer 20 can include an individual actually interested in acquiring the item to be sold, an individual merely curious about the item, a representative of an individual who is interested in acquiring the item to be sold, and so on. Similarly, the seller 30 in the context of this disclosure has broad meaning and can include anyone who furnishes the buyer 20 with the opportunity to purchase the item. Examples of a seller 30 can include the current owner of the item, a representative or agent of the owner such as a real estate agent, someone such as a buyer's representative who provides the buyer with the opportunity to purchase the item, or the like. A lender 40 is anyone who can provide access to funds, whether it is for debt or equity. Examples include banks, loan officers, venture capitalists, or the like. In the embodiment described below, the seller is generally considered a real estate agent, the buyer is a prospective purchaser of real property, and the lender is a loan officer. Of course, the scope of the invention is not limited to the disclosed examples, but rather is defined by the appended claims.

The computerized system 10 includes a set of instructions and/or interfaces embodied on a computer readable medium for execution on a digital processor. One example is a computer program stored on a memory device, such as a hard drive or some form of programmable read only memory device. This example also includes at least one processor for operating the computer program. Alternatively, the computerized system 10 could be a network of computers all operating according to the instructions of the computer program. The buyer 20, seller 30, and lender 40 preferably communicate with the computerized system 10 through a wide area network such as the Internet.

The computerized system 10 is capable of storing information about all of the parties 20, 30, 40 that use the system 10. In the preferred embodiment, this information is stored in a database system operating on one or more computers. The information stored about the parties 20, 30, 40 can be set according to pre-defined fields in a database table (or database objects in an object-oriented database environment). In the preferred embodiment, the type of information stored about each party 20, 30, 40 (i.e., the system "profile" for each party) is flexible, and can be varied depending on the needs of the users. For instance, a particular lender 40 (or lending institution) may wish to track particular information about their buyers 20 that is not desired by another lender 40. For example, one lender may wish to track a buyer's current interest rate on their existing mortgage loan for the purpose of future advertising campaigns, while another lender may not desire to track this information. The system 10 is flexible enough to allow these variations.

Communications with the Buyer

Overview

The purpose of the computerized system 10 is to provide item information 11 to the buyer 20 based upon buyer specific information 12 stored in the system 10. At the same time, the system 10 allows the seller 30 and the lender 40 to simultaneously monitor and assist the buyer 20 in his or her use of the system 10. For example, the seller 30 is able to correspond with the buyer 20 and lender 40 through the computerized system 10, and to share notes 13 regarding the buyer 20 with the lender 40. Similarly, the lender 40 can contact the buyer 20 and the seller 30 and share notes 13 with the seller 30. The buyer 20 is able to contact the seller 30 and lender 40, either to request information from each, or provide information to each.

Each buyer 20 will be invited to participate in the system 10 by another party, such as a seller 30 or lender 40. As the buyer 20 uses the system, the seller 30 and lender 40 will both stay in communication with the buyer 20 to help them use the system 10, to make decisions about the buyer's financial ability to purchase an item, and to complete an item purchase. The purpose of this communication is to help encourage the buyer 20 to use the seller 30 and/or the lender 40 to complete a purchase transaction. The primary benefit of the system 10 is to maintain this contact with potential buyers 20 and thereby increase the number of buyers 20 that use their services.

Prompts

The present invention differs from other contact management systems in that communications are managed and prompted by the system 10. The system 10 controls the prompts so that the multiple parties communicating with a buyer 20 do not overwhelm the buyer 20 with too many contacts 16, while also ensuring consistent communication with the buyer 20 for each communicating party. The buyer contact manager component 14 monitors all communications with the buyer 20 made by either the seller 30 or the lender 40. In the preferred embodiment, the buyer contact manager 14 provides prompts 15 to the seller 30 and the lender 40 to make contact 16 with the buyer 20 on a weekly basis. This prompt might be a symbol, such as a pulsating black dot next to the name of a buyer 20 on a list of buyers. Other methods of prompting include providing a list containing only those buyers 20 that the system 10 is currently prompting that seller 30 or lender 40 to contact. It is also possible that a communication with a buyer 20 will take place without anyone receiving a prompt 15.

To avoid overwhelming the buyer 20, the system 10 prompts only one of the sellers 30 and lenders 40 on a given week, and then prompts the other on the next week. In this way, the buyer 20 will receive communications only once per week, and the seller 30 and lender 40 will be prompted when it is their turn to make the communication. In addition to prompting about communications with the buyer 20, the system 10 is able to periodically prompt lenders 40 to make contact 16 with sellers 30. These types of lender-seller contacts 16 assist in creating a good working relationship between lenders 40 and sellers 30.

The person responsible for the contact can choose how to make the contact—whether by phone, by e-mail, or another way. If the contact is made by e-mail, the sender of the e-mail can choose to send a copy of the e-mail to the other parties responsible for communicating with the buyer 20. In addition, form e-mails can be provided to aid in the creation of the e-mail. When the e-mail is sent, the system 10 automatically updates a communication history log, saves the e-mail for future reference, and removes the prompt. In the preferred embodiment, the prompt 15 is a symbol that appears next to a buyer 20 in a buyer listing. This symbol is changed once the contact has been made, such as by placing a check mark over the symbol and by causing any animation (such as pulsing) to cease. If the contact 16 is made with the buyer 20 by phone or by other means, the system presents an entry screen in which the contact particulars (date, time, location, etc.) and notes about the contact 16 can be stored. This information is used to update the history log, and the prompt 15 for that buyer 20 is then removed.

Shared Notes

In order for the communication 16 with the buyer 20 to be relevant and useful to the buyer 20, the party 30, 40 that is making the communication will need information about the buyer's current status in evaluating items. Consequently, the system 10 tracks activity information and buyer notes 17 concerning the properties that the buyer 20 reviews. By examining this information 17 and the notes 13 previously created by both the seller 30 and the lender 40, the party 30, 40 making the current communication 16 will be informed about the current status of the buyer 20 and can make relevant comments and suggestions.

The system 10 can record buyer notes 17 about the property, and will record the buyer's interaction with the system 10 for later review by the seller 30 and lender 40. In addition, the system 10 is designed to allow sellers 30 and lenders 40 to input their own notes 13 about a buyer 20. These notes 13 can include notes actually written by the seller 30 and lender 40, as well as a communication log generated by the system 10 for each communication 16 tracked by the system. These notes 13 will be shared with all entities in the system 10 that are working with that buyer 10, which include the seller 30 and the lender 40 in the embodiment shown in FIG. 1.

While searching the item information 11, the buyer 20 will likely desire to store certain items or properties in a notebook for later review. The notebook contains a subset of the items available through system 10 that the buyer 20 has individually selected. The buyer 20 uses the notebook to store items or properties that are of particular interest so that the properties can be reviewed in detail at a later time. The notebook can notify the buyer 20 about changes to any relevant information concerning the selected items. Consequently, if the price for an item in the buyer's notebook were to change, the system 10 could immediately notify the buyer 20. The system 10 can also track these types of changes over time, allowing the buyer 20 to see a log of all relevant changes to an item as tracked by the system 10. It is contemplated that the buyer 20 can create several notebooks to store more than one subset of items. The buyer 20 can delete a listing from the notebook at any time. In addition, the buyer 20 is able to add personal notes 17 to any item in the notebook. In fact, the preferred embodiment allows the buyer 20 to add notes to any item in the system 10, whether or not the item is currently within a notebook. The seller 30 and lender 40 are able to review the notebook, as well as any buyer notes. 17

Strategic Business Sources

Figure 2:
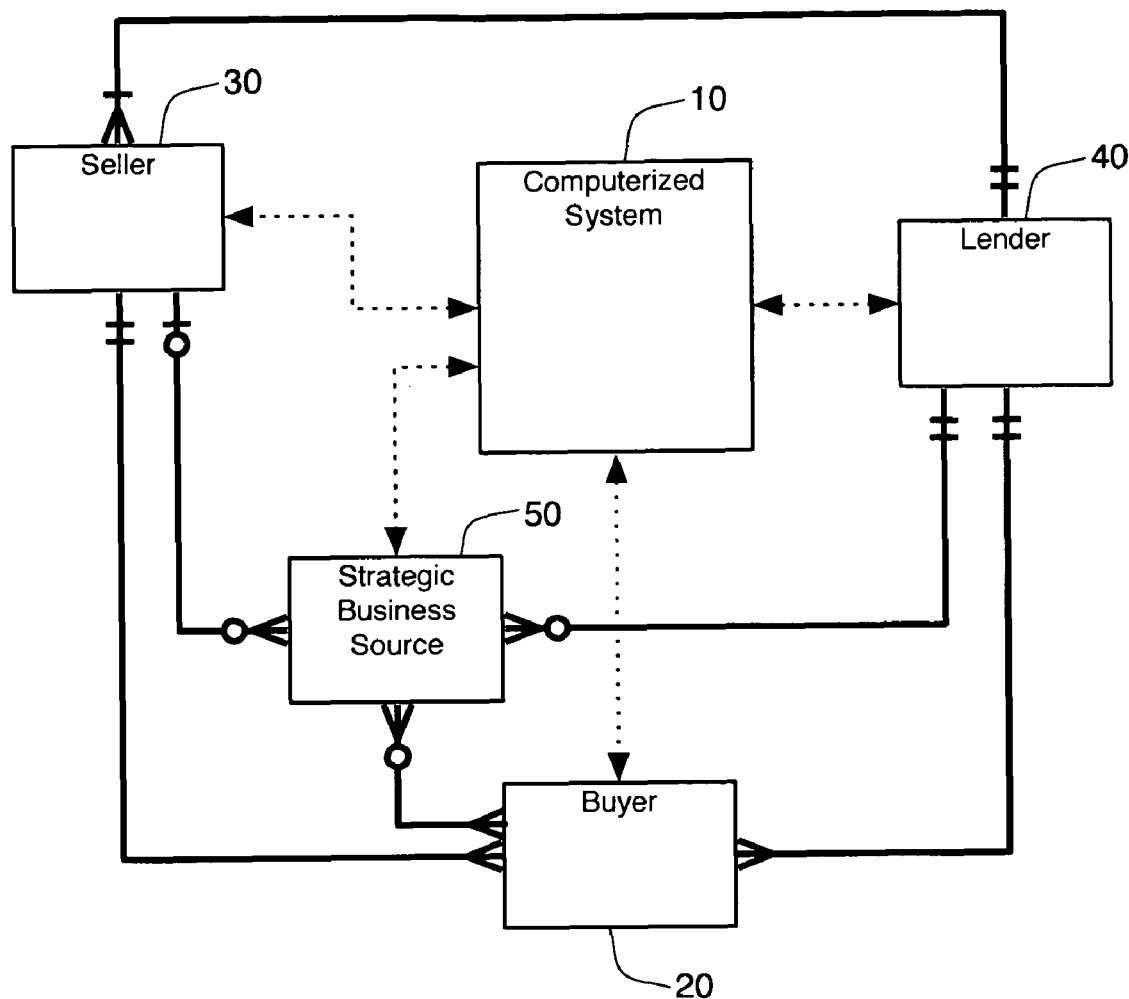
FIG. 2 is an alternative embodiment of the present invention incorporating strategic business sources in addition to buyers, sellers, and lenders.

FIG. 2 shows an alternative embodiment of the present invention, in which the three main parties using the system 10, namely the buyer 20, seller 30, and lender 40, are joined by a fourth party, namely a strategic business source (or affiliate) 50. A strategic business source 50 can be any party that may be of use to the buyer 20 in addition to the seller 30 and lender 40, such as a home inspector or moving company. Alternatively, the strategic business source 50 may be any party who would be willing to recommend that buyers 20 participate in the system 10 with a particular lender 40. In the preferred embodiment, the strategic business source 50 is not another seller 30 or lender 40.

In this embodiment, the strategic business source 50 is prompted by the computerized system 10 to contact the buyer 20 much like the seller 30 and lender 40 are prompted. The above-described embodiment evenly distributed prompts for contacting the buyer 20 between the seller 30 and lender 40. However, this type of even distribution is not necessary with every embodiment. For instance, in this alternative embodiment, the system 10 could be programmed to prompt the lender 40 to make every other contact, while the seller 30 and strategic business source 50 split the remaining contacts. For instance, the system could first prompt the lender 40 to make the contact, then the seller 30, then the lender 40 again, and then the strategic business source 50, with this pattern repeating indefinitely.

In this embodiment, strategic business sources 50 are associated with particular buyers 20, and could access information about the buyers 20 their interface into the system 10. All parties 30, 40, and 50 would keep and share notes with each other about the buyer 20. In addition, the buyer's interface into the system 10 will now include information about the strategic business source 50 as well as information about the seller 30 and lender 40.

Associations

FIG. 2 also shows the affiliations that are established by the system 10 between each of the parties 20-50. These affiliations are shown in thick, solid lines using the format normally used for entity relationship diagrams in database design. As shown in this diagram, each buyer 20 in the system is associated with a single seller 30 and a single lender 40, while the sellers 30 and lenders 40 can be associated with multiple buyers 20. Each seller 30 in turn is associated with a single lender 40, while a lender 40 can be associated with multiple sellers 30. Since each seller 30 using the system 10 is associated with only a single lender 40, all buyers 20 brought into the system 10 by the seller 30 are automatically associated with that single lender 40.

In certain situations, some data in the preferred embodiment cannot be shared with a buyer 20 unless that buyer is associated with an authorized agent 30. This may cause issues when a buyer 20 is entered into the system by a lender 40 before that buyer 20 has agreed to work with any particular seller or agent 30. Consequently, the present invention may assign a default agent 30 that will be used whenever buyers 20 are entered into the system by the lender 40. The lender 40 can override this choice at any time, but this technique assures that all buyers 20 will be associated with an agent 30. In one embodiment, this default agent will be exceptional in that the system 10 will allow the default agent to be associated with multiple lenders 40 simultaneously.

As for strategic business sources 50, it is not necessary for any strategic business sources 50 to be involved in the relationship between the buyer 20, seller 30, and lender 40. Consequently, FIG. 2 shows that it is always possible to have zero strategic business sources 50 associated with a party. Furthermore, it is possible for each buyer 20, seller 30, and lender 40 to be associated with multiple strategic business sources 50. Each strategic business source 50 can be affiliated with only a single lender 40. In this way, all buyers 20 entered into the system 10 by the strategic business source 50 will automatically be associated with the lender 40 affiliated with the strategic business source 50. It is also possible, but not required, that a strategic business source 50 be associated with a particular seller 30. If so, the buyer 20 entered by the strategic business source 50 will also be affiliated with that seller 30. In this way, the lender 40 indirectly benefits by strategic business sources 50 that are recruited to join the system by a seller 30, since all new buyers 20 generated by the strategic business source 50 will be affiliated with both that seller 30 and that lender 40.

In yet another alternative embodiment (not shown in FIG. 2), a strategic business source 50 may be allowed to affiliate with multiple related lenders 40, such as different loan officers 40 working for the same lending institution. In this case, the strategic business source 50 must select a single lender 40 to be associated with any buyers 20 entered into the system 10 by the strategic business source 50.

Activations

In order to ensure that the lender 40 and the buyer 20 communicate with each other, the preferred embodiment of the system 10 does not allow the buyer 20 to utilize the system 10 until the lender 40 submits the buyer 20 to system 10 for activation. Typically, submission for activation will occur only after the lender 40 has participated with the buyer 20 in setting a comfortable price range for items searched for on the system 10. When new buyer specific information 12 is entered into the system 10, the alerter 18 alerts sends an alert 19 to the lender 40 to notify the lender 40 that a new buyer 20 is awaiting activation. When a lender 40 logs into the system, a list of buyers 20 awaiting activation will appear, together with each buyer's corresponding seller 30 and any corresponding strategic business source 50. In the preferred embodiment, each buyer 20 in the list of buyers awaiting activation will contain a link to a page where the lender 40 can continue submitting a selected buyer 20 for activation. The link will access a page that includes buyer-specific information 12 and the seller's notes 13 regarding the buyer 20. Alternatively, the lender 40 may elect to directly enter buyer information into the system 10. Either way, the lender 40 is allowed to create notes 13 regarding the buyer 20 that the seller 30 and lender 40 can review at a later time.

The lender 40 will next select whether to reject, amend or submit the buyer 20 for activation. This decision can be based on financial information, price range, or both. If the buyer 20 is financially unable to purchase at this time, the lender 40 can cancel the buyer 20 thereby preventing any further access to the system 10 by the buyer 20. Alternatively, the "cancel" step could simply leave the buyer 20 pending until financial issues are resolved or further information is received. The lender 40 can also amend the search criteria stored in the buyer specific information 12, such as raising or lowering the maximum price of the item based on the buyer's financial information. After amending this information, or after choosing not to amend such information, the lender 40 can submit the buyer 20 for activation. The lender 40 then saves the activation submission and awaits official activation of the buyer 20 by system 10.

Amending Search Criteria and Re-Enrollment

Once the buyer 20 is activated, the system 10 will generate item information 11 for the buyer 20 about items available for purchase. The financial parameters established by the lender 40 can be used to control the properties available for search on the real estate listings database. For instance, if the buyer is qualified to buy properties only to a specific price point, the system 10 can refrain from presenting item information 11 to the buyer 20 for more expensive items. If the buyer 20 wishes to increase this price point for any reason, the buyer 20 will communicate with the lender 40 to request this change. The item information 11, the amended buyer-specific information 12, and the lender's notes 13 about the buyer 20, are also made available to the seller 30 at this time.

For each activated buyer 20, the lender 40 may be given the opportunity to cancel the buyer 20. In addition, if the system permits only a limited enrollment period, the buyer detail page 190 may allow the lender 40 to re-enroll the buyer 20 for a new period. If the enrollment of the buyer 20 has expired, the buyer 20 may not be able to access his or her search results or notebook until the lender 40 re-enrolls the buyer 20. A buyer 20 may also request a change in their data, such as an increase in the price component of the search criteria. The system 10 may also prevent an enrolled buyer 20 from increasing this price component after activation without requesting that the lender 40 authorize or perform such a change. The buyer 20 may freely amend other fields, such as number of bathrooms or neighborhood.

Institutional Hierarchy

Figure 3:
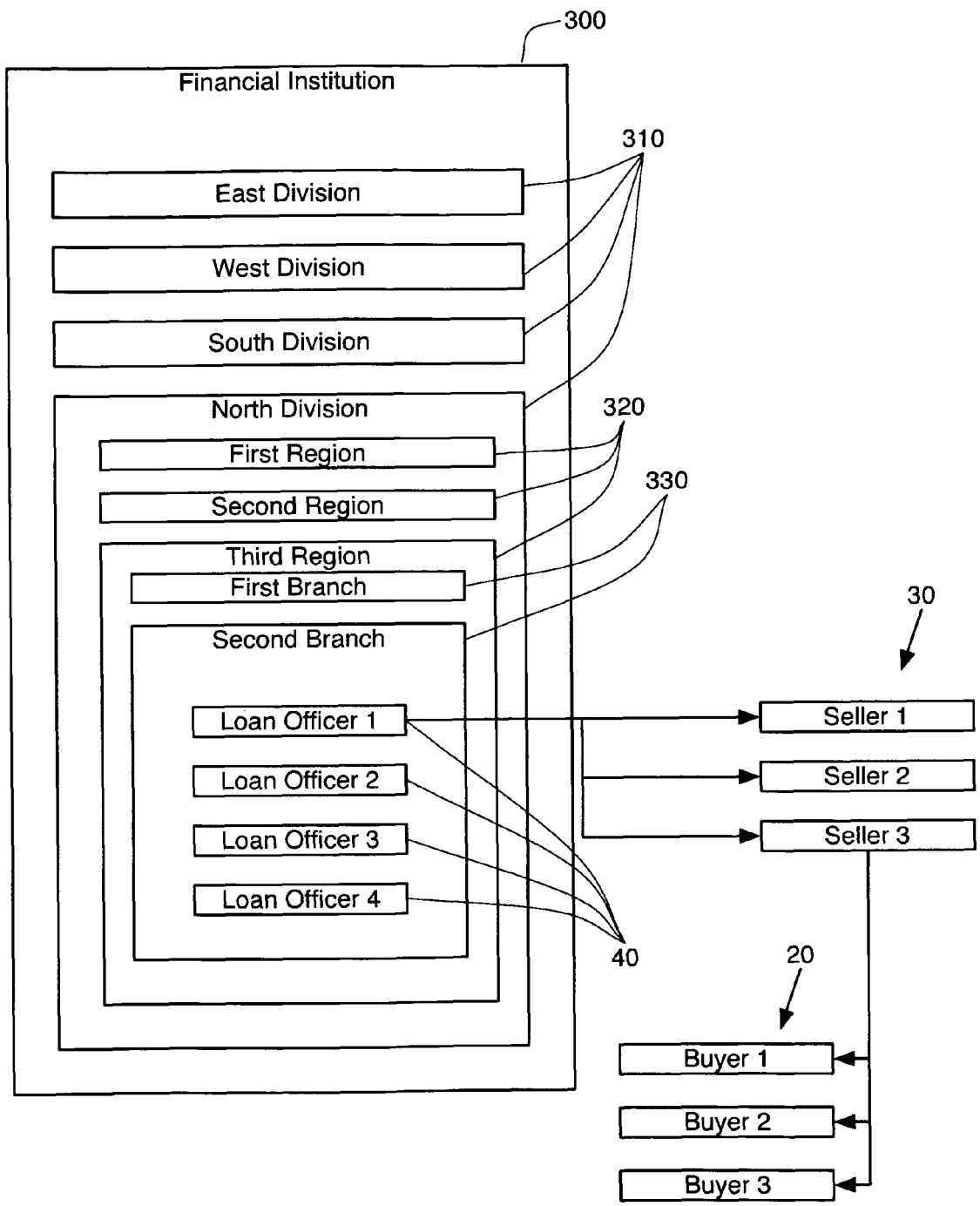
FIG. 3 is a schematic representation of financial institution hierarchy.

The primary benefactors of the computerized system 10 are financial institutions who have numerous lenders 40 within their organization. One such institution 300 is shown schematically in FIG. 3. This lender institution 300 is divided into a business hierarchy, which in this case divides the entire institution into four divisions 310. These four divisions 310, named East, West, South, and North, are each divided into separate regions 320. In FIG. 3, only the North division 310 is shown with multiple regions 320, even though all divisions 310 are likely to have separate regions 320 in an actual lender institution 300. Each region 320 is likely to contain a plurality of branches or offices 330, such as the First and Second Branches 330 shown as part of the Third Region 320 in FIG. 3. Each branch 330 in turn is likely to hire a plurality of loan officers, who are the actual lenders 40 that make contact with the sellers 30 and buyers 20 in the above examples.

In FIG. 3, Loan Officer 1 works for the Second Branch 330 of the Third Region 320 of the North Division 310 of the Lender Institution 300. This Loan Officer 40 works with three real estate agents, who are the sellers 30 of the above examples. The third seller 30 (labeled "Seller 3" in FIG. 3) has signed up three buyers 20 to be associated with that seller 30 in the computerized system 10. Each of these three buyers 20 is also associated with Loan Officer 1. The financial institution 300 will encourage all of their lenders or loan officers 40 to actively use the system 10 to work with sellers 30. If each lender 40 works with numerous sellers 30, and each of the sellers 30 encourages multiple buyers 20 to use the system 10, the financial institution 300 will soon have many prospective buyers 20 using the system 10, with each buyer 20 being consistently reminded of the financial services provided by the institution 300.

The hierarchy shown in FIG. 3 is merely an example hierarchy for the purpose of explaining the present invention. Other hierarchies are commonly used in financial institutions and are well within the scope of the present invention.

Business Model and Planning Tool

Figure 4:
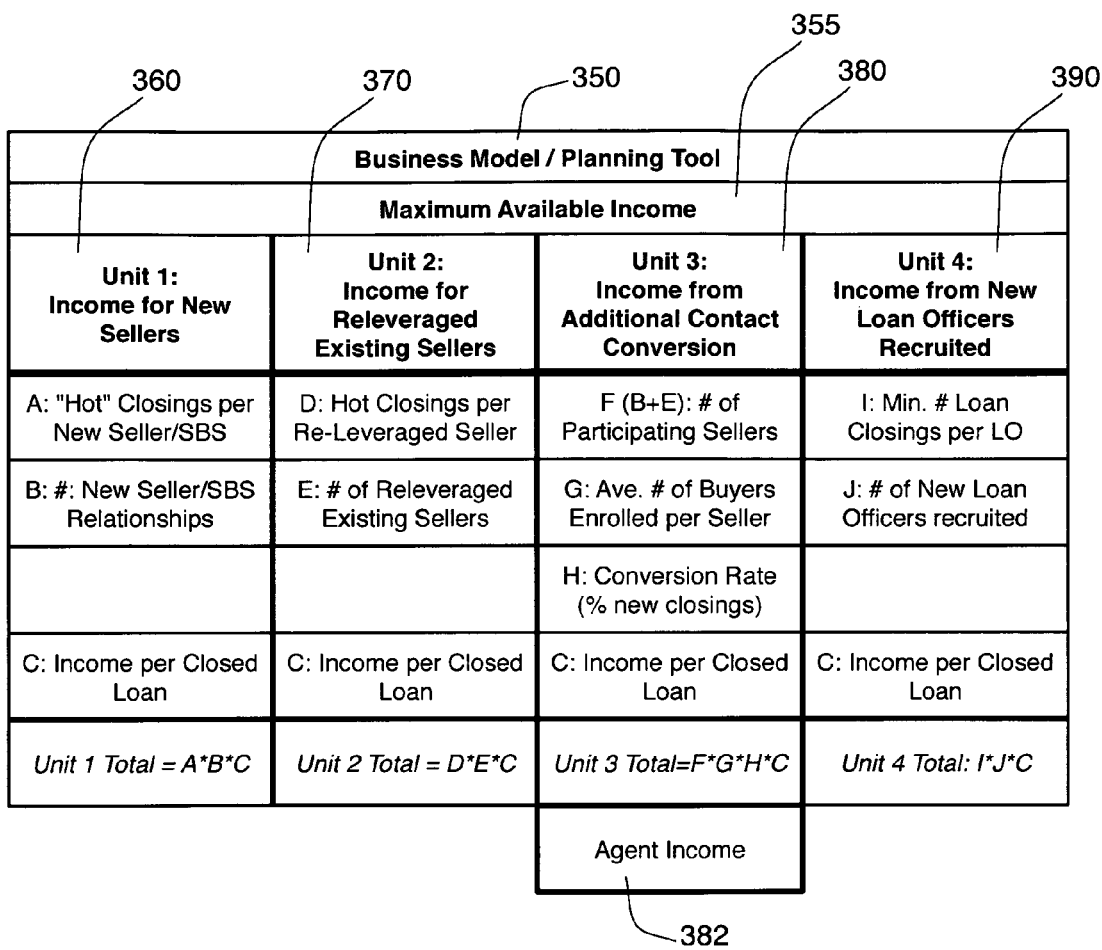
FIG. 4 is a table showing the primary features of a prior art business model for financial institutions.

FIG. 4 shows a four-unit business model 350 where each of the four units 360, 370, 380, and 390 describe a separate source of increased revenue available as a result of using the computerized system 10. The maximum available income tool 355 helps to determine the maximum income available to the business unit without increasing overhead expenses. This tool 355 is described below in more detail in connection with FIG. 10.

The first unit 360 of the planning tool 350 is designed to estimate the income that will be returned to the financial institution 300 as a result of working with new sellers 30. This is determined by multiplying the number of new closings per month associated with each seller 30 (looking only at the typical closings developed by a single seller 30 without assuming any improvement in the closing rates that might be obtained through use of the computerized system 10) by the number of new sellers 30 that may work with the lender as a result of the computerized system 10 and the estimated income per closing.

The present invention also is able to track new income in the first unit 360 that is associated with new affiliates or strategic business sources 50 using the system 10. If a financial institution 300 were able to attract a large number of strategic business sources 50, these strategic business sources 50 will naturally bring with them additional buyers 20 into the system 10, which will in turn lead to an increase in closings done by the financial institution 300. For example, if a home inspector can typically bring four potential buyers 20 into the system 10 every month, it may be reasonable to assume one out of the four will lead to a closing using the lender 40. Consequently, this first unit 360 includes not only additional closings associated with new sellers 30, but also additional closings associated with new strategic business sources 50 using the system. The number of new closings expected for each new affiliate (box "A" in FIG. 4) is assigned based on the type of affiliate and the experience of the financial institution 300 (or alternatively upon the experience of all financial institutions using the system 10).

The second unit 370 relies upon "re-leveraging" sellers 30 that already do business with the financial institution 300. The value obtained by re-leveraging sellers 30 is calculated by having the lender institution 300 estimate a number of additional "hot closings" per re-leveraged seller 30 that would otherwise have been lost, and multiplying this by the number of sellers that will be re-leveraged and the income to the institution 300 per closing.

The third unit 380 reflects the fact that each lender 40 using the system should be able to create more closings ("incubated closings") by encouraging buyers 20 to use the system 10. The theory in this unit is that the percentage of buyers 20 that use the lender 40 for closing will be higher when those buyers 20 use this system 10 than the percentage would be if the buyers 20 are informed about the lender 40 (such as through a business card provided by a seller 30) but do not use the system 10. To calculate this value, the number of participating sellers is multiplied by the number of buyers each seller 30 will enroll, which in turn is multiplied by the improved conversion rate estimated by the lender institution 300 and by the income received by the institution 300 per closing.

Finally, the fourth unit 390 reflects the fact that the use of the system 10 by the financial institution should increase the productivity of the loan officers 40, and therefore should aid in the recruitment of more loan officers 40. The potential value of this recruiting tool is calculated by taking the minimum number of loans that are required by the institution 300 from each loan officer 40, and multiplying this by the number of loan officers that have been recruited based on the availability of the system 10 and the income per closed loan as estimated by the lender. The total potential income increase to the institution 300 is calculated by adding the four units 360-390 together.

A manager of the local branch 330 is generally assigned the responsibility for inputting certain values into the various units 360-390 of the planning model 350 as business objectives or goals. These four goal items are shaded on FIG. 4, along with item "F" which is the sum of items "B" and "E".

The present invention allows a manager to track the goals found in the four units 360-390 directly against real-world values relating to the use of the system 10. Feedback on meeting plan goals can be provided every time a manager logs into the system 10. In addition, the present computerized system 10 allows individual business plans for branches 330 to be aggregated together to form a plan for regions 320, divisions 310, or even the entire institution 300. Information from all branches 330 in a region 320 is "rolled-up" for the benefit of the manager of that region 320. This information is made available not only to the manager of each region 320, but also to the manager of each division 310, as well as to those individuals that are responsible for the performance of the entire institution 300. By rolling this data up to the different levels of the institutional hierarchy, a powerful management tool is created that allows managers to see live performance data for the hierarchy levels and individuals that they manage.

The business model 350 shown in FIG. 4 is appropriate for an entire financial institution 300, or for any level manager in the institution 300. With the exception of the fourth unit 390, the model 350 is also appropriate for individual loan officers 40. Consequently, in one embodiment of the present invention an individual manager of a local branch 330 will task the individual loan officers 40 with creating their individual goals for boxes B, E, and G of plan 350. While the manager may not accept the aggregate of these goals for their own branch-level plan, the manager now has the ability to compare the results tracked by the system with the goals of each individual loan officer 40. The system 10 can also give feedback to each loan officer 40 on how their current numbers relate to the goals in their individual business model.

Since the agent 30 is also a frequent user of the system 10, it may be appropriate to modify the business plan 350 for the needs of the agent 30 (or for the needs of a broker employing multiple agents 30 as explained below in connection with FIG. 11). In examining the business plan 350, the most relevant information appears in boxes G, H, and C (as shown in the middle three boxes of the third unit 380). Thus, while such a business plan can be created, it will require as a goal only a number for expected new buyer enrollments, which will then be multiplied by the conversion rate and the seller's expected income per closing (i.e., C'). This number is the expected increase in agent income 382 associated with use of the system 10. This figure can be used along with the new buyer enrollment goal to give an agent 30 a business plan against which their current performance can be measured.

Management Page
Basic Tools

Figure 5:
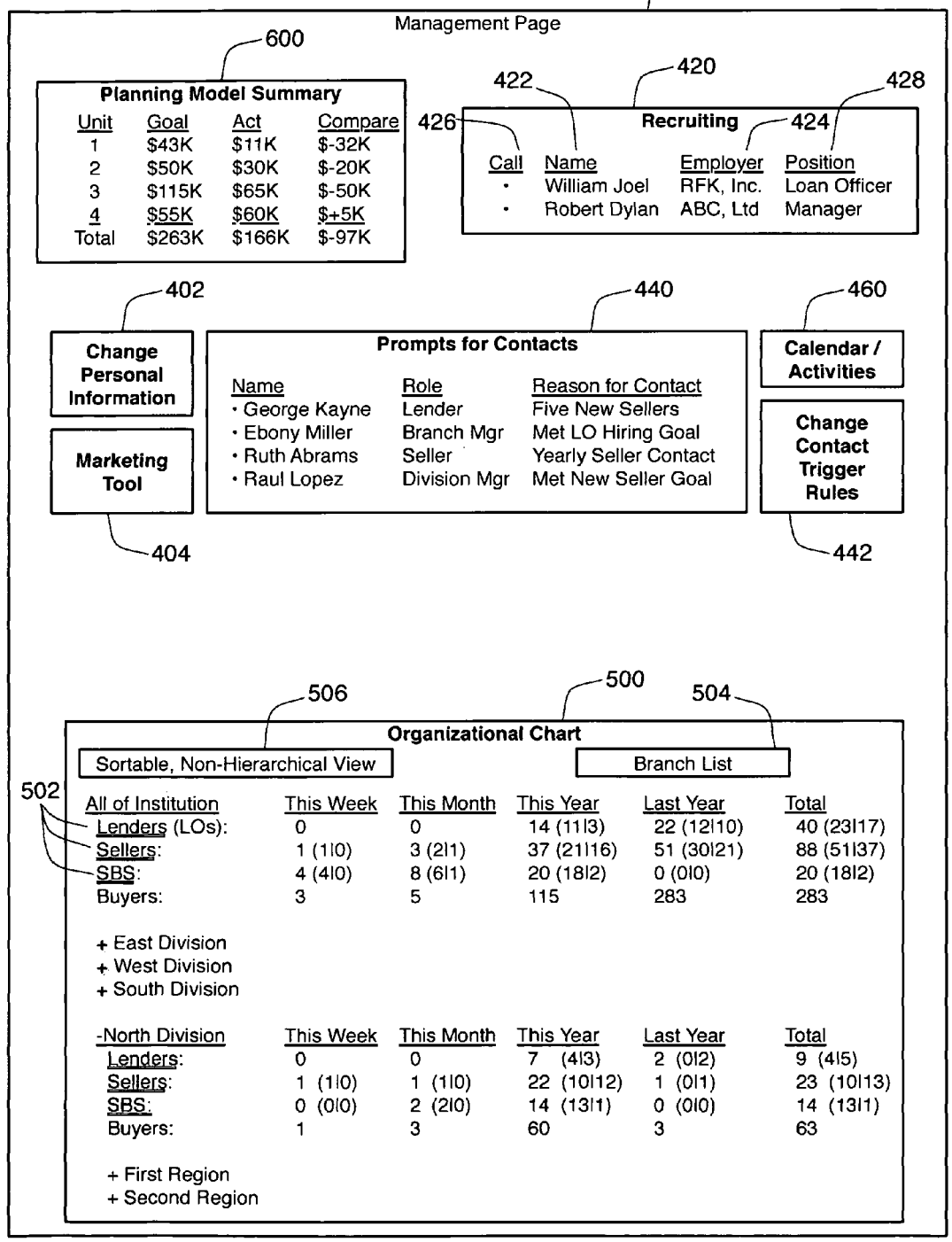
FIG. 5 is a block diagram of a management interface into the system of FIG. 1.

The present invention presents this information and additional resources to these managers through a management portal to the system 10 such as management page 400 shown in FIG. 5. This page 400 represents the type of information that may be useful to a manager of a branch 330, region 320, division 310, or any other hierarchy level in a financial institution 300.

The management page 400 includes the ability of a manager to access and change personal information about herself or himself by following link 402. In addition, the page contains a marketing tool 404 for the manager to access training materials to train people on the system 10. In addition, the marketing tool 404 preferably provides marketing materials that can be used to market the services of the financial institution 300. These marketing materials can be added to the system 10 by the financial institution 300 to allow managers and lenders 40 to quickly develop an automated marketing campaign. Since the contact information for buyers 20, agents 30, and strategic business sources 50 are already in the system 10, the marketing tool can be programmed to both generate and electronically deliver marketing materials to a selected target audience. Furthermore, the marketing tool 404 can be linked to a publishing or fulfillment house that can both prepare physical marketing materials and also deliver the materials to the intended recipients. For instance, as explained below the present invention is capable of tracking certain information relating to closings of buyers 20 that use the lending services of the lending institution 300. This information may include the interest rate of the loan given to the buyer 20. The marketing tool 404 would allow a manager or lender 40 to select those buyers 20 who have a loan interest rate that is above the current interest rate to be the recipients of an automated marketing campaign. This campaign would inform these selected buyers 20 of the low current rates and the refinancing services of the lending institution 300.

The management page 400 can also include a calendar/activity tool 460. This tool allows the manager to use the page 400 to plan and schedule events and meetings that are designed to help an individual meet their goals as established in the business model 350. This can be done through a traditional calendar/to-do list interface that indicates when certain events should take place. For instance, a manager may have responsibility for having periodic meetings with their loan officers 40 or lower level managers. It may also be important for a branch manager to have biannual meetings with all of the sellers 30 and strategic business sources 50 that are associated with their branch. These meetings could be automatically scheduled in the calendar, with flexibility that would allow the manager to reschedule the meetings as appropriate. Alternatively, these meetings could appear on a monthly to do list to ensure that they take place every month. Invitations to the meetings could be sent through the system 10. Furthermore, the system could require that the manager confirm that the expected event actually took place. In the preferred environment, the calendar/activity tool 460 not only tracks that the responsibilities took place, but also requests input from the manager on the success of the activity. For instance, if a monthly agent focus meeting is expected, the system 10 will prompt the manager to input the number of agents that attended the meeting. The system may also request that the manager complete a monthly report of expected activities, including such information as the number of recruiting interviews conducted by the manager in that month. By monitoring when these activities took place and how successful they were, managers that are higher up in the hierarchy of the lending institution 300 will be able to monitor their manager's compliance with established goals.

In addition to these basic links, there are four primary tools presented through the management page 400, namely recruiting tool 420, contact prompting tool 440 for contacts to be made by the manager, an organizational chart tool 500 containing information about hierarchy levels and the individuals being managed by the manager, and planning model information tool 600. Each of these tools 420, 440, 500, and 600 can be shown on the main management page 400 with some summary information as shown in FIG. 5. Alternatively, the management page 400 can simply provide links to separate pages that provide the manager with additional information and options dealing with each tool 420, 440, 500, and 600. As a third embodiment, the management page 400 could focus in on only one important tool, such as the organizational chart tool 500, and merely include links to all of the other tools 420, 440, and 600. In addition, although these tools 420, 440, 500, and 600 are described separately in this description of the present invention, it would be well within the scope of this invention to combine some or all of the information and options available within the separate tools into a single common interface. For example, the organizational chart 500 is designed to provide certain types of information about hierarchy levels within the financial institution 300. This chart 500 could optionally include information down to the individual level, with prompts for individual contacts that are shown within tool 440 in FIG. 5. Furthermore, while planning model information 600 is shown as a separate tool, it too could be combined with the information found in the organization chart 500. Finally, while prompts and prospective recruit information are shown in the recruiting tool 420, it would be possible to combine this information and prompts within the prompts for contacts tool 440. Consequently, while these tools 420, 440, 500, and 600 are considered separate features of the management page 400 in this description, the combining of several tools together or the removal of other tools from the management page 400 should still be considered within the scope of the present invention.

Recruiting Tool

Loan officer recruiting is an integral part of the fourth unit 390 of planning tool 350, and is a key component to increasing the productivity of the financial institution 300. The recruiting tool 420 is designed to allow managers at any level of the financial institution 300 to directly monitor and participate in the recruitment of loan officer candidates into the financial institution 300. In addition, this tool 420 can be used to recruit managers that would work under the recruiting manager.

The recruiting tool 420 in its simplest form is a database of candidates that are not currently employed by the financial institution 300 but have been selected as recruiting targets by the manager. The database contains the candidate's name 422, current employer 424, planned position in the financial institution 428, contact information, priority (such as hot, warm, cold), notes, and prior contact information. Furthermore, the system is able to roll-up recruiting information to managers higher up in the hierarchy of the financial institution 300. This allows a regional manager to spot potential issues, such as when two branch managers are recruiting the same candidate. This ability also allows a higher-level manager to spot trends in the institution's lender recruiting practices, including a heavy emphasis on candidates currently employed by a single competitor. In addition, the recruiting tool 420 includes prompts 426 that indicate when the manager should contact the prospective candidate. Ideally, the system 10 will track the last time that the candidate was contacted, and will prompt the manager to make regular contact with the candidate. In the preferred embodiment, the responsibility to contact a candidate can alternate between two or more managers. For instance, the system 10 could prompt for weekly contacts from a manager, with three out of four contacts coming from the branch manager, and one out of four contacts coming from the regional manager. This division of contact responsibility would automatically be handled by the system 10, prompting each manager when it is their turn to contact the candidate much like is described above in connection with lender 40 and seller 30 contacts with a buyer 20. Upon selecting the prompt 426, the system preferably opens a notes page in which the manager can track notes about the candidate or send an e-mail to the candidate. In the preferred embodiment, the branch manager is encouraged to maintain a list of ten potential candidates in the lender recruiting tool 420.

Contact Prompting Tool

The contact-prompting tool 440 is a tool designed to centralize all of the contact responsibilities of the manager into a single place. In the preferred embodiment of the system 10, a manager may be expected to make regular contacts with prospective candidates, as described above in connection with the recruiting tool 420. In addition, a branch manager may be responsible for contacting existing loan officers 40 and lower-level managers every week to discuss their progress with the system 10, and for contacting enrolled sellers 30 and strategic business sources 50 twice a month to thank them for their business and to encourage their use of the system 10. Similarly, a regional manager may be expected to send e-mails to all sellers 30 working in their region every other month. Such regular contacts can be easily programmed according to the desire and preferences of the financial institution 300. As explained previously, the system 10 manages such contacts by tracking when the next contact is due, and then prompting the responsible party to make the contact at the appropriate time. The sharing of the responsibility to contact a person between two different users of the system 10 is also easily programmed into the contact prompting tool 440. Because of the hierarchical nature of the present invention, managers at any level of the institution 300 can be prompted to contact lower level managers as well as those lenders 40, sellers 30, and buyers 20 that are associated with their section of the hierarchy.

In addition to regularly timed contacts, the system 10 is designed to monitor the activities of individual users and to track statistics associated with specific entities within the hierarchy of the financial institution 300. The system 10 can then be programmed to automatically trigger certain communications from managers based upon the monitored activities and statistics. For instance, system 10 can be programmed to have a manager contact an individual in the following circumstances:

| Who to Contact | Circumstances |
| --- | --- |
| Branch Manager | Hiring of new loan officer |
| Branch Manager | Meeting goal in any unit of financial plan |
| Loan Officer | Linking with new seller |
| Loan Officer | Linking with ten new sellers |
| Seller | Bringing $10,000,000 of loans into the institution |
| Regional Manager | Hit 60% of goal in hiring new loan officers |
| Division Manager | All branches have completed financial plan |

These prompts allow the manager to recognize those individuals in their area of responsibility that have met certain milestones. In addition, these prompts provide a quick indicator of corporate success in implementing the system 10 and the financial plan 350. While it is generally preferable to have such triggers be based on positive results, it is also possible to have triggers indicate that a contact is needed when goals are not being met. For instance, if a branch has not yet completed its financial plan 350 or has not had the expected monthly meeting with their lenders 40 (as indicated by the calendar module 460), the regional manager could be prompted to remind the branch manager to do so. Alternatively, the system could track those lenders 40, sellers 30, and managers who do not make their prompted contacts when the system 10 requests, or who regularly fail to complete a certain percentage of prompted contacts. In these circumstances, an e-mail from a superior may be useful to remind them of the importance of completing the prompted contacts.

The managers of the system 10 can easily program these prompts by following link 442. The prompting rules can be established so that they are uniform throughout a financial institution 300. When more than one institution is being serviced by an application service provider, it is even possible that the prompting rules can be made uniform across multiple financial institutions 300. Alternatively, the system 10 can be designed so that each manager can customize their prompts to more closely match their management style. In one embodiment, an institution 300 creates a uniform set of prompting rules, and each manager is given limited flexibility to change a subset of those rules.

It is possible to use these same trigger rules to present messages to the manager that do not require a contact to be made with another individual. In this way, the system 10 could be programmed to automatically remind an individual to perform a task, or to have the system 10 notify the branch manager automatically when a goal in one of the units 360-390 of their business plan has been met. While these notices could be programmed in much the same way as the prompts for contacts 440, the notices would not have to appear within this tool 440, but could appear elsewhere on the management page 400.

In addition, trigger rules can be used to prompt contacts with buyers 20, sellers 30, or strategic business sources 50. For instance, if a buyer 20 had been enrolled but had not made any use of the system 10 for a certain period, a prompt could be made to the seller 30 or lender 40 to contact the buyer 20 to answer any questions the buyer 20 may have. In this way, prompts to contact buyers 20 can be based both upon timing considerations and upon the occurrence of particular events.

Organization Chart

The organizational chart tool 500 is designed to provide the manager an overview of their portion of the institutional hierarchy. The organizational chart 500 shown in FIG. 5 includes data about the entire institution 300, including all four divisions 310 and all regions 320 and branches 330. A manager of a particular division 310 would likely be allowed to see only data related to their division 310. The organization chart 500 is presented in the manner of a collapsible outline, starting with the highest level of the institutional hierarchy visible to the manager. In this case, the entire institution 300 is at the top of the tool 500. Underneath this are listed the four divisions 310: East, West, South, and North. In the preferred embodiment, it is possible to expand and contract each level of the hierarchy so as to show only the data of interest to the manager. Collapsed items may include a plus ("+") character next to them. Clicking on this character will expand that item. Expanded items may have a minus ("−") character, which is used to collapse that item. In FIG. 5, the East, West, and South Divisions 310 are collapsed, while the North division 310 is expanded. The North Division 310 includes two regions 320 (First and Second), both of which are collapsed. A non-hierarchical view of the organization chart 500 is available by following link 506. This view lists all levels of the hierarchy, and allows the levels to be sorted according to the data columns found in the organization chart 500.

Each expanded level of the organization chart tool 500 includes information about how that level is meeting the goals of the business plan 300. In particular, the tool 500 shows a count of new lenders or loan officers 40, sellers 30, strategic business sources 50, and buyers 20 that are added to the system 10 in several time frames. The time frames are preferable the current week, month, and year, and the last week, month, and year, and the total for the system to date (although FIG. 5 shows only the current week, month, and year, last year, and the total for the system to date). In the preferred embodiment, the entries for lenders 40, sellers 30, and strategic business sources 50 are further divided into three parts according to the following structure:

TOTAL(NEW|EXISTING)

The reason that the numbers are divided in this way is that it lets the manager distinguish between people who are new to the financial institution 300 and those existing loan officers 40, sellers 30, and strategic business sources 50 who have started to use the system 10. The distinction between new and existing sellers is important in determining whether the goals of the business model 350 are being met. This is because element "B" relates to new seller and strategic business source relationships and element "E" relates to sellers that already work with a lender 40 or the institution 300 but have just begun to use the system 10. In addition, item "J" relates only to new loan officers 40 that are now using system 10 and not to pre-existing loan officer employees who have started to use the system 10.

Lists

As seen in FIG. 5, the organizational chart tool 500 is a useful tool to reach other information about the performance of a financial institution 300. By clicking on the "Lenders," "Sellers," or "SBS" labels 502 in the organizational chart 500 (FIG. 5), the management page 400 will switch to a filterable lender list 510, seller list 520, or strategic business source list 530, respectively. The relationship of these lists 510, 52, 530 to the organizational chart tool 500 is shown in FIG. 6.

The lender list 510 is shown in more detail at FIG. 7. As seen in that figure, the list contains the following information for each lender 40: their name, branch, contact information, enrollment date, total count of active buyers 20 in the system associated with that lender 40, the pipeline amount equal to the loan value estimated for all of the active buyers 20, the count of sellers 30 associated with that lender 40, and a plurality of links in the form of icons. The buyer count and pipeline statistics refers to active buyers, which in this context includes buyers 20 actively using the system 10 as well as pending buyers 20 that have been placed into the system 10 but have not yet been activated by the system 10. The seller count includes a total value, as well as sub-values for new and existing sellers. The links include links to additional pages about this lender 40. In the preferred embodiment, the links include a link to history log page that shows login times and activities for this lender 40. Additional links include a link to a seller list 520 listing the sellers 30 associated with this lender 40, a link to the main home page 180 for this lender, and a link to a report 560 for this lender 40.

The seller list 520 (FIG. 8) and strategic business source list 530 (FIG. 9) are very similar to the lender list 510, but includes information about a particular seller 30 or strategic business source 50. In addition, the seller count field is replaced with a listing of the loan officer 40 associated with each seller 30 or strategic business source 50. Finally, the buyer count fields in lists 520, 530 are divided into three numbers representing the total buyer count, the count of buyers enrolled in the last month, and the count of buyers enrolled in the last three months.

There is also a branch list 580 that lists all the branches 330 in the financial institution 300 and their managers. The branch list 580 is available by following link 504 on the main section of the organization chart tool 500. The branch lists contains fields similar to the lender list 510, with the addition of a field indicating the number of new lenders 40 that have been recruited at that branch 330. The branch list 580 also includes a link to a page 540 showing the business model 350 data for that branch 330, and a link to a data entry page 550 for each unit 360-390 that allows a manager to complete all elements of the business model 350 for that branch 330.

Each of the lists 510-530, 580 includes the ability to filter the lists according to filter criteria that relates to displayed data columns and is entered at fields 512, 522, and 532. In addition, the preferred embodiment includes the ability to send broadcast e-mails to selected members of any list. This is accomplished by providing a checkbox next to each entry on the list. The manager checks the desired recipients (or the "select all" button 514, 524, 534), and then sends a broadcast e-mail to all checked parties by clicking on button 516, 526, or 536. The content of the e-mail can be chosen from a stored message database, or can be custom created.

The report page 560 can be accessed simply by clicking on one of the links next to a lender 40, seller 30, strategic business source 50, or branch 330 on the lender list 510, seller list 520, strategic business source list 530, or branch list 580 pages. Alternatively, a search page 570 could be used to customize a report. In the preferred embodiment, particular reports can also be saved on the search page 570, such as whole-institution reports or division-level reports. The actual report page 560 contains additional details about lenders 40, sellers 30, strategic business sources 50, and organization entities within the financial institution 300. FIG. 6 shows the type of information available on the report 560, including buyer enrollment numbers, pipeline figures, active buyer percentages, associated sellers 30, lenders 40 recruited, and active lender percentages. Some of this information is not appropriate for sellers 30 (such as associated sellers) while other information is appropriate only for entities and is not appropriate for sellers 30, lenders 40, or strategic business sources 50 (such as new lenders recruited or active lender percentages). Where such data is not appropriate, the field is left blank as shown in FIG. 6.

The report 560 preferably contains more detailed columns for data than that shown in FIG. 6. For instance, the preferred embodiment report 560 contains nine different buyer enrollment columns (to date total, to date active, enrolled pending activation, this week, last week, this month, last month, this year, and last year). In addition, the active usage percentage column is preferably divided into percentages of buyers who have: i) logged in ever, ii) logged in within the last seven days, iii) have items in their notebooks, and iv) have saved items in their notebooks in last three days. Similarly, the associated sellers and lenders recruited column can be divided into the same types of categories as the buyer enrollment column, and can even be further divided into new sellers 30 versus existing sellers 30 and newly recruited lenders 40 versus existing lenders 40. In addition, the active lender percentage can be divided into the percentage of lenders that have logged into the system 10 in the last seven days and the percentage of lenders 40 who have made their black dot calls this week. Finally, the report 560 can also include an indication as to whether a particular branch 330, lender 30, seller 20, or strategic business source 50 is completing the processes expected by the system 10. For instance, lenders 30, sellers 20, and strategic business sources 50 are all expected to contact their appropriate individuals when prompted by the system 10. Since the system tracks these prompts and the resulting contacts, the report could indicate whether these contacts are taking place and whether they are taking place in a timely manner. If the report indicates that a lender is never making their prompted contacts, a manager can investigate why this is so. Alternatively, if an entire branch is not making the prompted contacts, or if branch meetings are not being regularly held, the report could provide this information to managers higher up in the financial institution hierarchy.

Planning Model Tool

Figure 10:
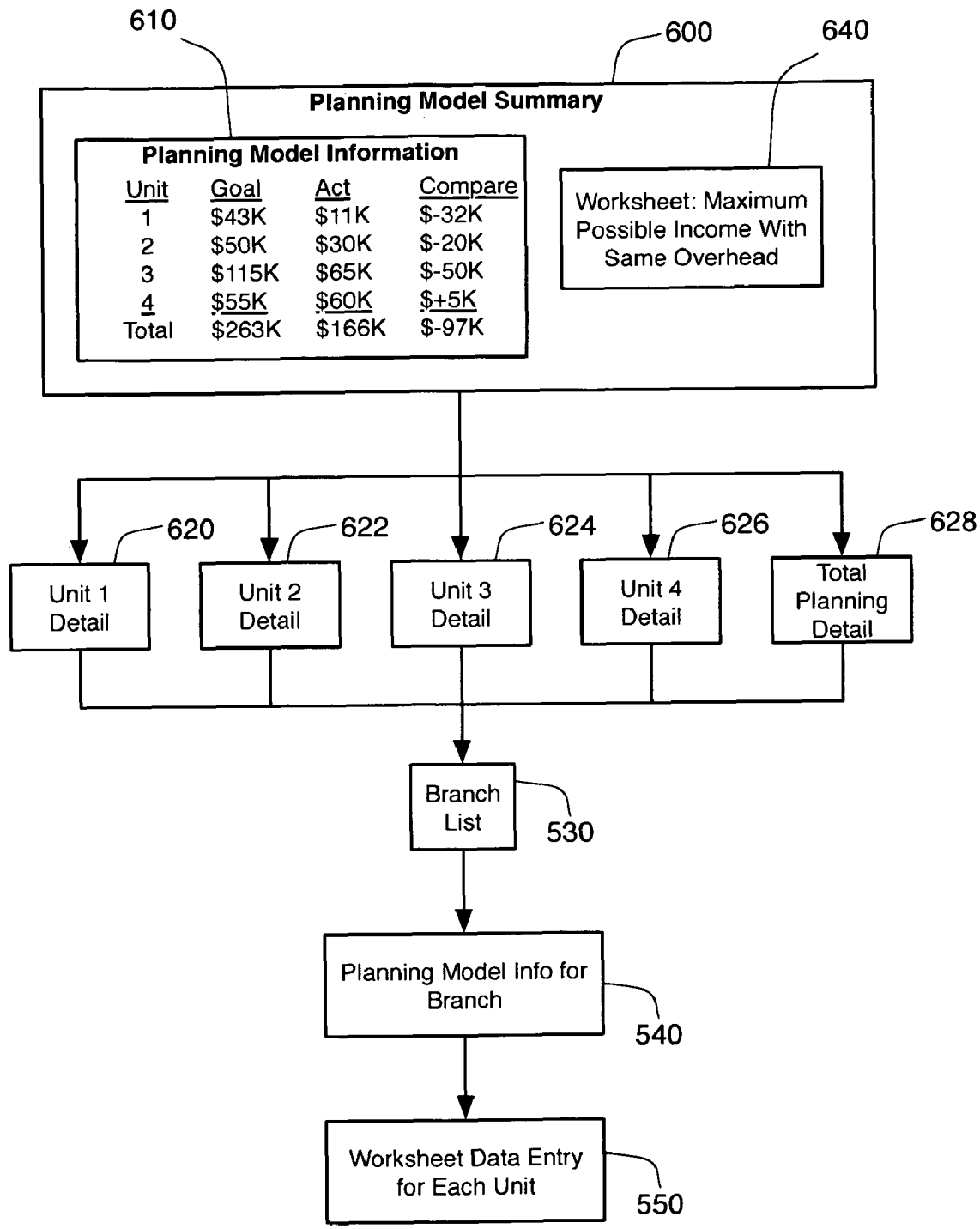
FIG. 10 is a block diagram of the planning model tool interface found in the management interface of FIG. 5.

The planning model tool 600 is shown in more detail in connection with FIG. 10. This tool 600 can provide an overview 610 for the manager of their goals as set forth in the business plan 350, including their actual performance in these areas and how their actual performance compares to their goals. This information is presented originally in summary fashion, such as in the dollar value totals 610 for each unit 360-390. More detailed information is presented in the detail pages 620-626, which describe the goals and actual performance for each unit 360-390 of the plan 350. Each of these detail pages 620-626 contains information about the values shown in FIG. 4 that are relevant for the particular unit 360-390. A detail total planning page 628 contains all the information from the other detail pages 620-626 in a single page.

In the preferred embodiment, none of these detail pages 620-628 allow the manager to change the goals or other values that were entered when the business model 350 was created. To do that modification, the manager enters the worksheet data entry page 550 through the branch list 580, as explained in connection with FIG. 6. This is because all goal planning for the business model 350 is made on a branch 330 by branch 330 basis. Of course, it is well within the scope of the present invention to allow the manager to directly edit the numbers for a particular branch without having to pass through the branch list page 580. This would be accomplished by providing a mechanism to select a branch for editing from the detail pages 620-628.

The planning model tool 600 also includes a worksheet 640 that is designed to determine the maximum income available without increasing overhead expenses. The worksheet asks each branch manager to estimate the maximum number of closings in a time period that can be accomplished at the branch based on existing operations and costs. When this is compared with the current number of closings at the branch, the difference can be multiplied by the income to the institution per closed loan (item "C" in FIG. 4) to calculate the branch's shortfall from the maximum income amount available. In the preferred embodiment, this worksheet is presented to the manager on the main portion of planning model tool 600. Alternatively, this worksheet 640 can be accessible by a link from the planning model tool 600. Since this worksheet 640 forms part of the business plan 350, and is preferably completed before completing any of the individual units 360-390, it is shown in FIG. 4 above each of these units 360-390 as tool 355.

Predictive Qualitative Analysis

One of the primary purposes of the system 10 is to encourage buyers 20 to select the lender 40 to provide financing for purchasing their desired house or other item. Ideally, the system 10 tracks when a buyer 20 elects to use the lender 40 for their purchase. By obtaining this information, the financial institutions 300 are able to analyze the level of success they are having by using the present system 10. The system 10 encourages the lender 40 to provide information about their closings by having this reporting be a normal part of their use of the system 10. This occurs by having the lender interface into the system 10 include the ability to enter closing information for all of the buyers 20 that are working with the lender 40. Information about the percentage of buyers 20 that close with a lender can be provided to managers in the reports 560 shown by the system. Nonetheless, this process alone will likely miss some closings made by a lender 40 for an affiliated buyer 20. Consequently, the system 10 also provides an incentive for the buyer 20 to report data on a loan closing with their affiliated loan officer 40. For example, when a buyer 20 self-reports a closing with a lender 40, the system 10 can request a fulfillment center to send a gift (such as a store gift card) to the buyer 20 on behalf of the lender 40. By informing the buyer 20 of this opportunity, the buyer 20 will have incentive to provide the closing data to the system 10.

One of the benefits that is derived from using the present system 10 is that a great deal of information is generated about the behavior of buyers 20, sellers 30, lenders 40, and strategic business sources 50. This data can be analyzed statistically in order to allow managers of a lending institution 300 to predict the outcomes of certain activities. For instances, if information about the loan closings that lenders 40 performed for buyers 20 is successfully tracked, then overall statistics can be generated about the percentage of buyers 20 that develop into income producing clients for the lending institution 300. This information can be fed back into the planning model to improve the accuracy of the model. Furthermore, the efficacy of certain lender 40 behaviors can also be tracked. For instance, this analysis could answers questions such as:

1) is it helpful for the system 10 to prompt the lender 40 to make frequent contact with the buyer 20, or are frequent contacts counterproductive?
2) do agents 30 that fail to complete their prompted communications with the buyer 20 add significantly to the number of closings for a lender 40, or should these agents 30 be removed from the system 10?
3) given certain activities of the buyer 20, how likely is it that a particular buyer will close within 30, 60, or 90 days?
4) given the activities of all of the buyers 20 in the system, how many buyers 20 in the pipeline will close in 30, 60, or 90 days?

Alternative Embodiment

The above description of the management page 400 describes how the present invention can be used by managers of a financial institution 300 to track their progress toward goals set forth in a business plan 350. In an alternative embodiment to the present invention, a similar management page is provided for managers of sellers 30 that utilize the computerized system 10. Just as the financial institution management page 400 was based upon a business model 350, the seller management page is based on a seller-oriented business model 700 as shown in the table of FIG. 11.

The first unit 710 of this model 700 calculates the potential revenue to the seller institution due to additional contact conversions resulting from the use of the present invention system 10. The seller manager is requested to input a goal for the number of new buyer enrollments that will be made per month (value "A" in unit 710). This number can be input as a single number for an entire seller institution branch, or can be based upon a per-seller (i.e., per-agent) number that is then multiplied by the number of sellers at that branch. This number is then multiplied by a given percentage of enrolled buyers who typically close with the seller 30. The total of A times B is then multiplied by the average revenue per closing for the branch ("C") to determine the total additional revenue for Unit 1.

The second unit 720 of model 700 calculates the revenue that can be obtained by a seller organization by recruiting new sellers 30. Since access to the system 10 is a valuable recruiting tool, this unit lets the seller manager place a dollar value on this benefit. Item "D" is the goal value for the number of new sellers that will be recruited. This number is then multiplied by the number of buyer side closings typically expected per seller ("E") and the average revenue to the seller institution per closing ("C") to obtain an revenue value for the second unit 720.

As was the case with the Lender business model 350, the seller business model has goal values in each unit 710, 720 that can be compared over time to actual values. These goals are the values "A" and "D," which are shaded in FIG. 11. The system can track performance of various levels of hierarchy in the seller institution as compared to these goals, and can show this comparison as numbers or as dollar values calculated as set forth in business model 700.

The management page for managers in seller institutions is very similar to the management page 400 described above for managers of financial institutions 300. The planning model summary 600 would show the various elements of the seller business model 700, but would otherwise be the same as described above for the financial institution business model 350. The contact prompts described in connection with section 440 above could be similarly arranged for the manager of a seller institution. As for the loan officer recruiting information 420, the seller manager page would set forth seller-recruiting information. The organizational chart 500, lists 510, 520, and reports 560 presented to the financial institution manager would also be useful for the seller manager. However, it is likely that information about lenders 40 would be excluded, leaving only information about the seller institution hierarchy, individual sellers 30, and buyers 20.

In this way, the present invention could provide management level information to managers of both financial institutions 300 and seller institutions. This ability greatly increases the usefulness of the computerized system 10.

The present invention has now been described with reference to several embodiments. The foregoing detailed description and examples have been given for clarity of understanding only. Those skilled in the art will recognize that many changes can be made in the described embodiments without departing from the scope and spirit of the invention. Thus, the scope of the present invention should not be limited to the exact details and structures described herein, but rather by the appended claims and equivalents.

What is claimed is:

1. A computerized method for use of a computerized system comprising:
   using software programming instructions stored on a tangible computer readable medium and operating on at least one processor used by the computerized system to perform the following programmed steps:
   a) creating in an electronic database in the computerized system the following database records:
      i) agent records,
      ii) strategic business source records,
      iii) lender records, and
      iv) and at least one lender institution record,
   b) creating associations in the electronic database by creating database relationships linking:
      i) a plurality of agent records with one lender record,
      ii) a plurality of business source records with one lender record, and
      iii) a plurality of lender records with one lender institution record;
   c) assigning in the electronic database a hierarchy level to a first portion of lender records linked to the one lender institution record and not assigning the hierarchy level to a second portion lender records linked to the one lender institution record;
   d) receiving a business plan for the hierarchy level into the computerized system, the business plan including:
      i) a goal for new seller records that are linked to lender records assigned to the hierarchy level, and
      ii) a goal for new strategic business source records that are linked to lender records assigned to the hierarchy level;
   e) creating within the electronic database a plurality of new seller records and new strategic business source records, and creating database relationships linking the new seller and strategic business source records to lender records assigned to the hierarchy level;
   f) tracking within the electronic database the number of new seller records and new strategic business source records that are linked to lender records assigned to the hierarchy level; and
   g) indicating through the computerized system how the number of tracked new seller records and new strategic business source records compares with the business plan.

2. The method of claim 1, wherein the business plan further includes a goal for new lender hires, and where the indicating step indicates how many new lender records are assigned to the hierarchy level as compared to the goal for new lender hires.

3. The computerized method of claim 1, further comprising
   h) creating a higher level containing the hierarchy level and at least one additional hierarchy level; and
   i) aggregating the numbers in the business plan for the hierarchy level with numbers in a business plan for the at least one additional hierarchy level into a business plan for the higher level.

4. The computerized method of claim 3, further comprising:
   j) tracking within the electronic database the total number of new seller records and associated strategic business source records that are linked in the database to lender records assigned to the hierarchy level or the at least one additional level; and
   k) indicating through the computerized system how the total number of tracked new seller records and associated strategic business source records compares with the business plan.

5. The computerized method of claim 1 further comprising:
   g) creating buyer records in the electronic database, the buyer records containing financial information and buyer search criteria;
   h) creating database relationships within the electronic database system linking each buyer record with both a lender record and an agent record;
   i) for each identified buyer record:
      i) withholding access to desired real estate listing information through a buyer user interface associated with the identified buyer record until after search criteria for the identified buyer record is activated;
      ii) presenting, through the computerized system, the financial information for the identified buyer record to a lender user interface associated with the lender record linked to the identified buyer record;
      iii) receiving activation of the identified buyer search criteria through the lender user interface wherein the identified buyer search criteria cannot be activated except through the lender user interface associated with the lender record linked to the identified buyer record; and
      iv) after activation of the identified buyer search criteria, granting access to the desired real estate listing information through the buyer user interface associated with the identified buyer record.

6. A tangible computer readable medium containing a computer program comprising:
   a) programming that creates in an electronic database in a computerized system the following database records:
      i) agent records,
      ii) strategic business source records,
      iii) lender records, and
      iv) and at least one lender institution record,
   b) creating associations in the electronic database by creating database relationships linking:
      i) a plurality of agent records with one lender record,
      ii) a plurality of business source records with one lender record, and
      iii) a plurality of lender records with one lender institution record;
   c) programming that assigns a hierarchy level to a first portion of lender records linked to the one lender institution record and not assigning the hierarchy level to a second portion lender records linked to the one lender institution record;

d) programming for receiving a business plan for the hierarchy level into the computerized system, the business plan including:
  i) a goal for new seller records that are linked to lender records assigned to the hierarchy level, and
  ii) a goal for new strategic business source records that are linked to lender records assigned to the hierarchy level;

e) programming that creates within the electronic database a plurality of new seller records and new strategic business source records, and creating database relationships linking the new seller and strategic business source records to lender records assigned to the hierarchy level;

f) programming that tracks within the electronic database the number of new seller records and new strategic business source records that are linked to lender records assigned to the hierarchy level; and g) programming that indicates through the computerized system how the number of tracked new seller records and new strategic business source records compares with the business plan.

7. The tangible computer readable medium of claim 6, wherein the business plan further includes a goal for new lender hires, and where the indicating programming indicates how many new lender records are assigned to the hierarchy level as compared to the goal for new lender hires.

8. The tangible computer readable medium method of claim 6, further comprising
  h) programming that creates a higher level containing the hierarchy level and at least one additional hierarchy level; and
  i) programming that aggregates the numbers in the business plan for the hierarchy level with numbers in a business plan for the at least one additional hierarchy level into a business plan for the higher level.

9. The tangible computer readable medium method of claim 8, further comprising:
  j) programming that tracks within the electronic database the total number of new seller records and associated strategic business source records that are linked in the database to lender records assigned to the hierarchy level or the at least one additional level; and
  k) programming that indicates through the computerized system how the total number of tracked new seller records and associated strategic business source records compares with the business plan.

* * * * *

UNITED STATES PATENT AND TRADEMARK OFFICE
CERTIFICATE OF CORRECTION

| | | |
|---|---|---|
| PATENT NO. | : 8,095,457 B2 | Page 1 of 1 |
| APPLICATION NO. | : 11/999299 | |
| DATED | : January 10, 2012 | |
| INVENTOR(S) | : Stephen M. Polston et al. | |

It is certified that error appears in the above-identified patent and that said Letters Patent is hereby corrected as shown below:

Column 5
Line 51
Delete "notes. 17" and insert --notes 17.--, therefor.

Column 19
Line 39
In Claim 1, delete "plurality of business" and insert --plurality of strategic business--, therefor.

Column 20
Line 62
In Claim 6, delete "plurality of business" and insert --plurality of strategic business--, therefor.

Signed and Sealed this
Nineteenth Day of March, 2013

Teresa Stanek Rea
*Acting Director of the United States Patent and Trademark Office*